UNITED STATES PATENT OFFICE.

CHARLES F. RUNEY, OF HOFFLAND, NEBRASKA, AND JOHN H. SHOW, OF LOS ANGELES, CALIFORNIA, ASSIGNORS TO POTASH REDUCTION COMPANY, OF HOFFLAND, NEBRASKA, A CORPORATION OF NEBRASKA.

PROCESS FOR TREATING ALKALI-METAL SALTS AND ALKALI-METAL-SALT BRINES.

1,409,784. Specification of Letters Patent. Patented Mar. 14, 1922.

No Drawing. Application filed March 30, 1921. Serial No. 457,036.

*To all whom it may concern:*

Be it known that we, CHARLES F. RUNEY and JOHN H. SHOW, citizens of the United States, residing at Hoffland and Los Angeles, in the counties of Sheridan and Los Angeles and States of Nebraska and California, have invented new and useful Improvements in Processes for Treating Alkali - Metal Salts and Alkali - Metal - Salt Brines, of which the following is a specification.

Our invention relates to a process for treating alkali-metal salts or alkali brines, such as occur in Western Nebraska and more especially those containing less than five per cent of sulphuric acid anhydride ($SO_3$), for the recovery and separation of the valuable constituents.

The process defined in this application is similar to those processes disclosed in our copending applications bearing Serial Numbers 402,626 and 402,627 filed Aug. 10, 1920, but the process of this application is especially adapted for use with salts or brines having a low content of sulphates, which makes the refining much simpler.

In case we start with a salt, this is dissolved in water and evaporated, or in case a brine is used, it is simply evaporated, until the salts coming out of solution test under 0.6% chlorine. The liquid and salts are then separated by filtration or the like. The salts from this first evaporation are dissolved in water or weak natural brine and crystallized. The product from this crystallization is a fine grade of sal soda ($Na_2CO_3$—$10H_2O$) which on drying will yield an extra good grade of soda ash.

The mother liquor from this evaporation is further concentrated until the greater part of the chlorides present our out of solution. This point is reached when the solution tests 50° Bé. The solution is then separated from the salts as before. These salts are dried and furnish a potash fertilizer salt. The mother liquor from the last operation is chilled which results in the crystallization of the greater part of the sodium salts present and the solution separated on drying, yields a very good grade of potassium carbonate.

The commercial performance of the above operation may be illustrated by starting with an amount of brine containing 10,000 pounds of salts in solution having the following composition.

| | |
|---|---|
| Potash ($K_2O$) | 23.15% |
| Soda ($Na_2O$) | 40.75% |
| Sulphate ($SO_3$) | 1.04% |
| Chloride (Cl) | 3.25% |
| Carbonate ($CO_2$) | 26.03% |

The first evaporation in accordance with the steps of the process as outlined above produces 6,340 pounds of a salt having the following composition:

| | |
|---|---|
| Potash ($K_2O$) | 4.53% |
| Soda ($Na_2O$) | 54.36% |
| Sulphate ($SO_3$) | 0.33% |
| Chloride (Cl) | 0.55% |
| Carbonate ($CO_2$) | 40.23% |

This salt on solution in weak brine and crystallization gives 12,600 pounds of sal soda ($Na_2CO_3$—$10H_2O$).

The mother liquor of the first evaporation is further evaporated the salts separated and dried and the dried salts obtained, amounting to 2,800, pounds have the following analysis:

| | |
|---|---|
| Potash ($K_2O$) | 40.26% |
| Soda ($Na_2O$) | 21.41% |
| Sulphate ($SO_3$) | 1.95% |
| Chloride (Cl) | 9.03% |
| Carbonate ($CO_2$) | 27.36% | which is a good grade of potash fertilizer salt. The mother liquor from the second evaporation is then chilled and the solution when dried produces 800 pounds of a good grade of potassium carbonate.

Having described our invention what we claim as new and desire to secure by Letters Patent, is:—

1. The process of treating alkali brines containing principally alkali metal carbonates to recover the salts in solution therein which consists in evaporating the solution until the salts precipitating test under 0.6% chlorine, separating these salts from the liquid, redissolving in water and crystallizing sodium carbonate out of the solution.

2. In the process of treating alkali brines containing principally alkali metal carbonates as specified in claim 1, concentrating the mother liquor separated from said salts until the chlorides present are practically all out of solution, which point is about 50°

Baumé, and separating the precipitated salts from the solution.

3. In the process set forth in claim 1 of treating alkali brines containing principally alkali metal carbonates, concentrating the mother liquor separated from the salts to precipitate substantially all of the chlorides therefrom, separating the precipitated salts, chilling the mother liquor then remaining to precipitate the sodium salts contained therein and drying the solution remaining to produce potassium carbonate.

In testimony whereof we have hereunto set our hands in presence of two subscribing witnesses.

CHARLES F. RUNEY.
JOHN H. SHOW.

Witnesses:
J. H. MILLER,
S. F. BURCKELL.